United States Patent [19]

Oger

[11] 4,378,909
[45] Apr. 5, 1983

[54] FISH-PLATES FOR ELECTRICALLY CONDUCTING RAILWAY RAILS

[75] Inventor: René Oger, Ville D'Avray, France

[73] Assignee: C. Delachaux, Gennevilliers, France

[21] Appl. No.: 199,618

[22] Filed: Oct. 22, 1980

[30] Foreign Application Priority Data

Nov. 6, 1979 [FR] France ................................. 79 27304

[51] Int. Cl.³ ...................... B60M 5/00; E01B 11/04; H01R 3/06
[52] U.S. Cl. ................................ 238/244; 191/29 R; 238/243; 238/263
[58] Field of Search ....................... 238/243, 244, 263; 191/29 R

[56] References Cited

U.S. PATENT DOCUMENTS 139,660  6/1873  Crandell ........................ 238/243 X
1,723,248  8/1929  Muller ............................... 238/244
3,730,310  5/1973  Spiringer ........................... 238/244

FOREIGN PATENT DOCUMENTS 792926  11/1935  France ................................. 238/244

Primary Examiner—Robert B. Reeves
Assistant Examiner—Howard Beltran
Attorney, Agent, or Firm—Parmelee, Miller, Welsh & Kratz

[57] ABSTRACT

A fish-plate comprises two sections which can be fitted, by way of a toothed surface, against corresponding toothed surfaces of two adjacent electrically conductive rails of a railway using bolts to tighten the sections towards each other. The teeth extend longitudinally, and the sections are vertically adjustable relatively to the rails to allow the fish-plate to be clamped to the rails at various heights.

5 Claims, 2 Drawing Figures

U.S. Patent     Apr. 5, 1983     4,378,909
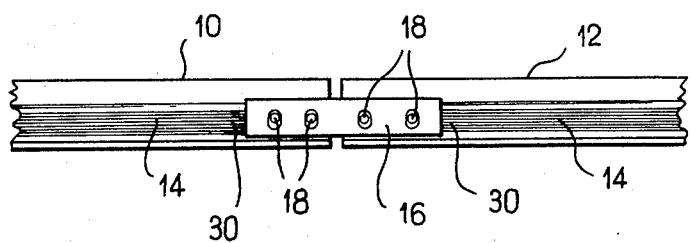
FIG_1
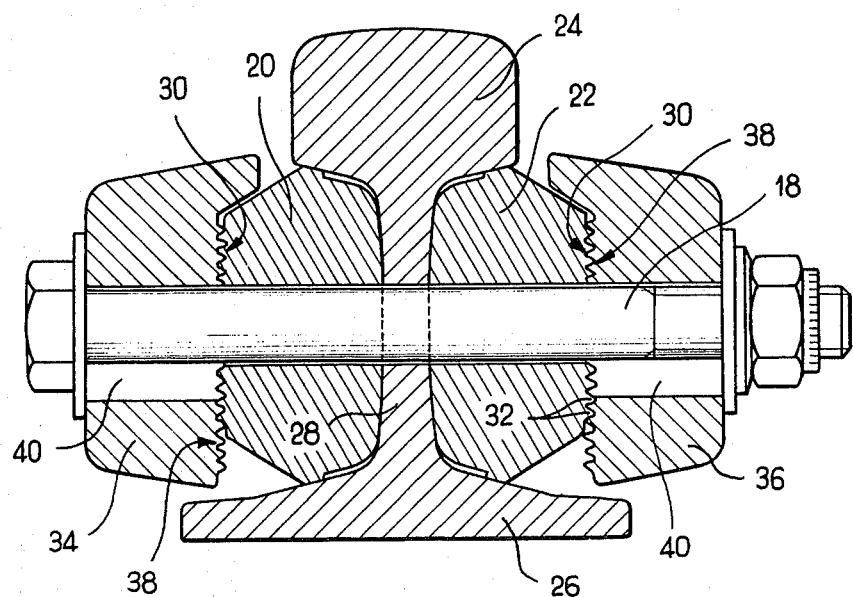
FIG_2

FISH-PLATES FOR ELECTRICALLY CONDUCTING RAILWAY RAILS

BACKGROUND OF THE INVENTION

This invention relates to electrically conducting railway rails and also to adjustable fish-plates for connecting two such rails end-to-end.

SUMMARY OF THE INVENTION

According to a first aspect of the invention there is provided a fish-plate for joining two electrically conducting railway rails and comprising two sections for location one on each side of adjacent ends of the two conducting rails to be joined, a surface on each of said two sections for contacting co-operating surfaces of the two conducting rails, teeth on each said surface of each of said two sections, said teeth extending parallel to the length of the rails for engagement with complementary teeth formed on said co-operating surfaces of the two conducting rails, two or more bolts for passing through the two sections and the rails to draw the two sections towards one another and against the rails with the teeth on the surfaces of the sections in engagement with the teeth on the co-operating surfaces of the rails, and means for allowing relative vertical movement between the rails and the two sections to enable the fish-plate to be located at various heights relative to each of the rails.

According to a second aspect of the invention, there is provided an electrically conducting rail for use with the fish-plate of the first aspect of the invention and comprising a head, a foot and a web extending between the head and the foot, and two extruded sections located between the head and the foot of the rail on respective opposite sides of the web, the two extruded sections having surfaces provided with teeth extending parallel to the length of the rail for engagement with the toothed surfaces of a fish-plate.

According to a third aspect of the invention, there is provided a fish-plate for connecting together adjacent ends of two end-to-end arranged electrically conducting railway rails, the fish-plate comprising two sections between which the ends of the rails are clamped, two surfaces formed on the two sections for engagement with the rails, teeth formed on the surfaces of the two sections and extending in a direction parallel to the length of the rails for engagement with co-operating teeth on the rails, bolts passing through the rails and the sections to clamp the sections against the rails, and means allowing vertical adjustments of the two sections relatively to each of the rails.

The following is a more detailed description of one embodiment of the invention, by way of example, reference being made to the accompanying drawings.

BRIEF DESCRIPTION OF THE DRAWINGS

FIG. 1 is a side view of two rails laid end-to-end and connected together by a fish-plate, FIG. 2 is a cross-section through one of the rails and the fish-plate of FIG. 1.

DESCRIPTION OF THE PREFERRED EMBODIMENTS

Referring first to FIG. 1, two rails 10 and 12 are laid end-to-end to form an electrical supply rail. The rail is the third electrically conducting rail for supplying electrical locomotives through shoes carried on the locomotives to slide along the third rail.

Side walls 14 of the rails constitute a conducting surface, and are formed, as shown in FIG. 2, by aluminium sections extending along the entire lengths of the rails, between the feet and the heads of the rails.

Fish-plates are used for mechanically and electrically connecting the ends of the rails by gripping both the adjacent ends of the rails. Such a fish-plate 16 is shown in FIG. 1. It is composed of two sections extending parallel to the rails with the sections being on opposite sides of the rails.

Bolts 18 pass through the fish-plate 16 and the rails in order to draw the two sections against the rails so that the rails are kept mechanically aligned and so that electric current is able to pass from one rail to the other. The sections of the fish-plate are preferably of aluminium, and are in contact with the conducting surfaces 14 of the rails.

The construction of the rail and fish-plate can be seen in more detail from the cross-section of FIG. 2. The conducting part 14 of the rail comprises two aluminium sections 20 and 22 which are located one on each side of the rail, and which are wedged between the head 24 and foot 26 of the rail so that they are pressed against the web 28 of the rail.

The conducting sections 20,22 comprise a longitudinally extending outer vertical surface 30 provided with teeth 32 (also shown in FIG. 1). The teeth 32 extend longitudinally in a direction parallel to the length of the rails. The sections are formed by extrusion.

The fish-plate is composed of two sections 34 and 36 of short length, and these sections each have a toothed surface 38 which co-operates with a toothed surface 30 of one of the conducting sections 20 and 22.

The teeth of the fish-plate are of the same configuration as those of the conducting sections, i.e. they extend longitudinally and are of such a shape as to enable them to engage with between the teeth of the facing toothed surfaces of the conducting sections. All the teeth are of the same shape, so that it is possible to set the fish-plate at various heights relative to the conducting rails, engagement between the teeth taking place at any required height.

The teeth could be of triangular cross-section to facilitate the positioning of the fish-plates.

The fish-plate is bolted on to the rails in order to grip and align them, and when the bolts 18 have been tightened, contact between the conducting sections 20,22 and the sections 34,36 of the fish-plate is very tight, so providing not only mechanical retention of the rail but also excellent electrical and thermal contact between the fish-plate and rails because of the increase in the contact surface area due to the presence of the teeth.

The bolts 18 pass through the rail web 28 and through the conducting sections 20 and 22 in bores having a diameter substantially corresponding to the diameter of the bolts. They also pass through the fish-plate sections, but by way of holes 40 which allow the bolts vertical play, for example holes which are elongated in a vertical direction. In this manner, the fish-plate can be tightened at various heights, with a minimum step of movement corresponding to the pitch of the longitudinal teeth of the rails and the fish-plate.

To position one rail in alignment with another, the fish-plate is disposed on one rail already positioned, and is then used to keep a second, unpositioned, rail in place by adjusting the level of the new rail to that of the rail already positioned, and then tightening the fish-plate at an appropriate level on each of the two rails. Only then are packing pieces placed under the flange of the second rail to the extent necessary to support it at a correct level.

The fish-plate can be advantageously used to replace a used rail by a new rail. The new rail, when laid, is, at the ends, higher than the ends of adjacent rails, and these latter rails are raised by tightening the fish-plate with the old adjacent rails at the appropriate level, before the insertion of packing pieces of required height under those rails which have not been replaced.

I claim:

1. A fish-plate for joining together two electrically conducting railway rails, each railway rail comprising a conventional rail including a foot, a head and a web extending between the head and the foot, and two conducting sections extending along the entire length of the conventional rail, between the foot and the head thereof, and forming the side walls of the rail, said fish-plate comprising:

two fish-plate sections for location one on each side of adjacent ends of the two electrically conducting railway rails to be joined, a surface on each of said two fish-plate sections for contacting co-operating surfaces of the conducting sections forming the side walls of the two electrically conducting railway rails, teeth on each said surface of each of said two fish-plate sections, said teeth extending parallel to the length of the electrically conducting railway rails for engagement with complementary teeth formed on said co-operating surfaces of the conducting sections, at least two bolts for passing through the two fish-plate sections, the conducting sections and the conventional rails to draw the two fish-plate sections towards one another and against the electrically conducting railway rails with the teeth on the surfaces of the fish-plate sections in engagement with the teeth of the co-operating surfaces of the conducting sections of the electrically conducting railway rails, and means for allowing relative vertical adjustment between the electrically conducting railway rails and the two fish-plate sections to enable the fish-plate to be located at various heights relative to each of the electrically conducting railway rails such that the electrically conducting railway rails may be joined with their upper surfaces in alignment even though they may be of a different height.

2. A fish-plate as claimed in claim 1 wherein the teeth on the two fish-plate sections are triangular in cross-section.

3. A fish-plate as claimed in claim 1, wherein the means for allowing relative vertical adjustment comprise means defining vertically elongate holes in the fish-plate sections through which the bolts pass to enable the fish-plate to be adjusted in height, the bolts also passing through means defining corresponding holes in the electrically conducting railway rails which are substantially the same diameter as the diameter of the bolts.

4. A fish-plate as claimed in claim 1, wherein the fish-plate sections are made of aluminium.

5. A fish-plate for connecting together adjacent ends of two end-to-end arranged electrically conducting railway rails, each of which comprises a conventional railway rail and a conducting section extending along the entire length on each side of the conventional rail, the fish-plate comprising two fish-plate sections between which the ends of the railway rails are clamped, two surfaces formed on the two fish-plate sections for engagement with the railway rails, teeth formed on the surfaces of the two fish-plate sections and extending in a direction parallel to the length of the rails for engagement with co-operating teeth on the conducting sections, bolts passing through the conventional rails, the conducting sections, and the fish-plate sections to clamp the fish-plate sections against the railway rails, and means allowing vertical adjustment of the two fish-plate sections relatively to each of the railway rails.

* * * * *